US009152571B2

(12) United States Patent
Kegel et al.

(10) Patent No.: US 9,152,571 B2
(45) Date of Patent: Oct. 6, 2015

(54) ALL INVALIDATE APPROACH FOR MEMORY MANAGEMENT UNITS

(75) Inventors: Andrew G. Kegel, Redmond, WA (US); Mark D. Hummel, Franklin, MA (US); Anthony Asaro, Toronto (CA)

(73) Assignees: ATI Technologies ULC, Markham, Ontario (CA); Advanced Micro Devices, Inc., Sunnyvale, CA (US)

( * ) Notice: Subject to any disclaimer, the term of this patent is extended or adjusted under 35 U.S.C. 154(b) by 158 days.

(21) Appl. No.: 13/563,253

(22) Filed: Jul. 31, 2012

(65) Prior Publication Data

US 2014/0040560 A1  Feb. 6, 2014

(51) Int. Cl.
*G06F 12/10* (2006.01)

(52) U.S. Cl.
CPC ........ *G06F 12/1027* (2013.01); *G06F 12/1081* (2013.01); *G06F 2212/683* (2013.01)

(58) Field of Classification Search
None
See application file for complete search history.

(56) References Cited

U.S. PATENT DOCUMENTS

| 2007/0214339 | A1* | 9/2007 | Wooten .......................... 711/202 |
| 2010/0011147 | A1* | 1/2010 | Hummel et al. .................... 711/6 |
| 2010/0332686 | A1* | 12/2010 | Creta et al. ....................... 710/5 |
| 2011/0202724 | A1* | 8/2011 | Kegel et al. .................... 711/118 |
| 2013/0262814 | A1* | 10/2013 | Asaro et al. ..................... 711/206 |

* cited by examiner

*Primary Examiner* — Gary Portka
(74) *Attorney, Agent, or Firm* — Volpe and Koenig, P.C.

(57) ABSTRACT

An input/output memory management unit (IOMMU) having an "invalidate all" command available to clear the contents of cache memory is presented. The cache memory provides fast access to address translation data that has been previously obtained by a process. A typical cache memory includes device tables, page tables and interrupt remapping entries. Cache memory data can become stale or be compromised from security breaches or malfunctioning devices. In these circumstances, a rapid approach to clearing cache memory content is provided.

21 Claims, 3 Drawing Sheets

ALL INVALIDATE APPROACH FOR MEMORY MANAGEMENT UNITS

BACKGROUND

1. Field

The disclosed embodiments relate generally to computer systems, and more particularly to memory management units for input/output (I/O) devices.

2. Background Art

Computer systems of various types are ubiquitous in modern society, including personal computers (PCs), workstations, servers, various personal digital assistant (PDA) devices, etc. Most, if not all, of these computer systems have implemented memory management functionality for access by a processor to memory. Generally, the memory management functionality has included translating addresses from a virtual address space used by each process to a physical address space that spans the actual system memory. Included with the memory management functionality are various memory protections (e.g., read only, read/write, privilege level requirements, etc.). The memory management functionality has a variety of uses, such as protecting the memory used by each process from unauthorized access by other processes, permitting large virtual spaces to be used by processes even if the physical memory system is not that large, relocation of virtual addresses to available physical memory without the participation of the process, and the like.

Like processor addresses that are frequently translated, addresses used by input/output (I/O) devices in computer systems can also be translated. That is, the I/O devices can use virtual addresses rather than physical addresses to access the memory needed to fulfill its operational requirements. Use of virtual addresses rather than physical addresses by devices is preferred in current day systems since it improves the overall security of the system. Use of physical addresses by a malfunctioning device (or a device programmed by a malicious software agent) would result in improper memory access, with potentially catastrophic consequences.

In single operating system (OS) computer systems, such as most PCs, the OS controls access to the I/O devices by other processes (applications and OS services). Accordingly, the OS can control which process has access to a given device at any given point in time, and can at least somewhat control the addresses accessed by the device. Virtual machine systems are more complex, as they may have multiple guest OSs running on a virtual machine monitor. In a virtualized system, many applications and I/O devices access physical memory through the use of virtual addresses. In such a virtualized system, an I/O memory management unit (IOMMU) is coupled to the I/O devices and the system memory. Here, the IOMMU is configured to translate the virtual address in the device memory request to physical addresses so that the device can access the physical system memory.

Performance indicators of an IOMMU include its efficiency of memory access, as well as its ability to perform in a variety of both normal as well as abnormal settings. Efficiency of memory access can be improved through the use of cache, a small, fast memory separate from the main memory that is used to hold recently accessed data.

BRIEF SUMMARY

What is needed is an approach that can efficiently reset or clear cached information pertaining to device table entries, I/O page table entries and interrupt remapping table entries, while preserving the IOMMU configuration and control information.

In some embodiments, a single command is invoked that clears the cached memory in the IOMMU, while maintaining the configuration and control information that pertains to the IOMMU itself. Cached information that is cleared includes the I/O page tables (holding guest translation and host translation information), device table entries and interrupt remapping tables. In some embodiments, the single command is implemented in hardware using hardware hooks so that execution of this command can be reduced to a small number of cycles, for example one or two cycles.

The features and advantages of the disclosed embodiments will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

BRIEF DESCRIPTION OF THE DRAWINGS/FIGURES

The accompanying drawings, which are incorporated herein and form part of the specification, illustrate the disclosed embodiments and, together with the description, further serve to explain the principles of the disclosed embodiments and to enable a person skilled in the relevant art(s) to make and use the disclosed embodiments.

Figure 3:
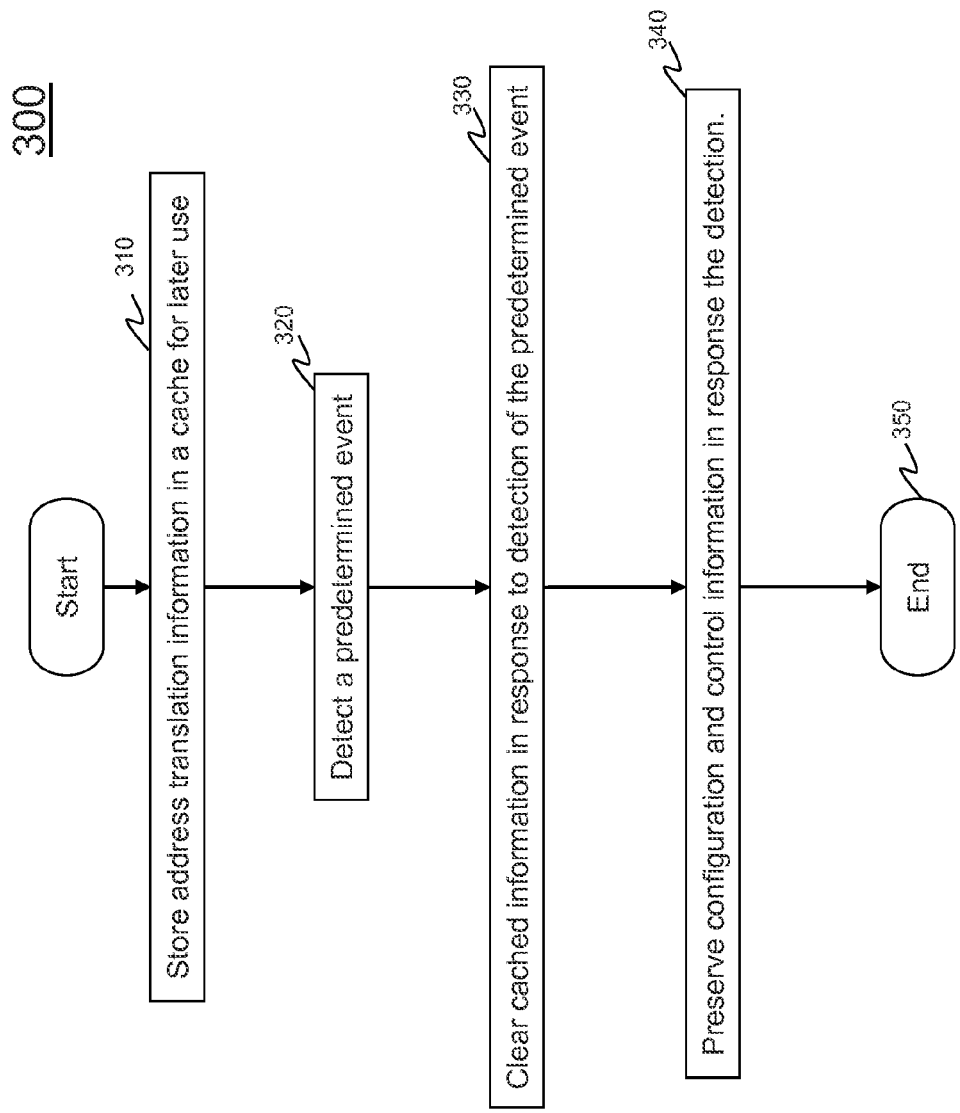

FIG. 3 provides a flowchart of a method for invalidating cached content stored by an IOMMU, in accordance with some embodiments.

The features and advantages of the disclosed embodiments will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

Figure 1:
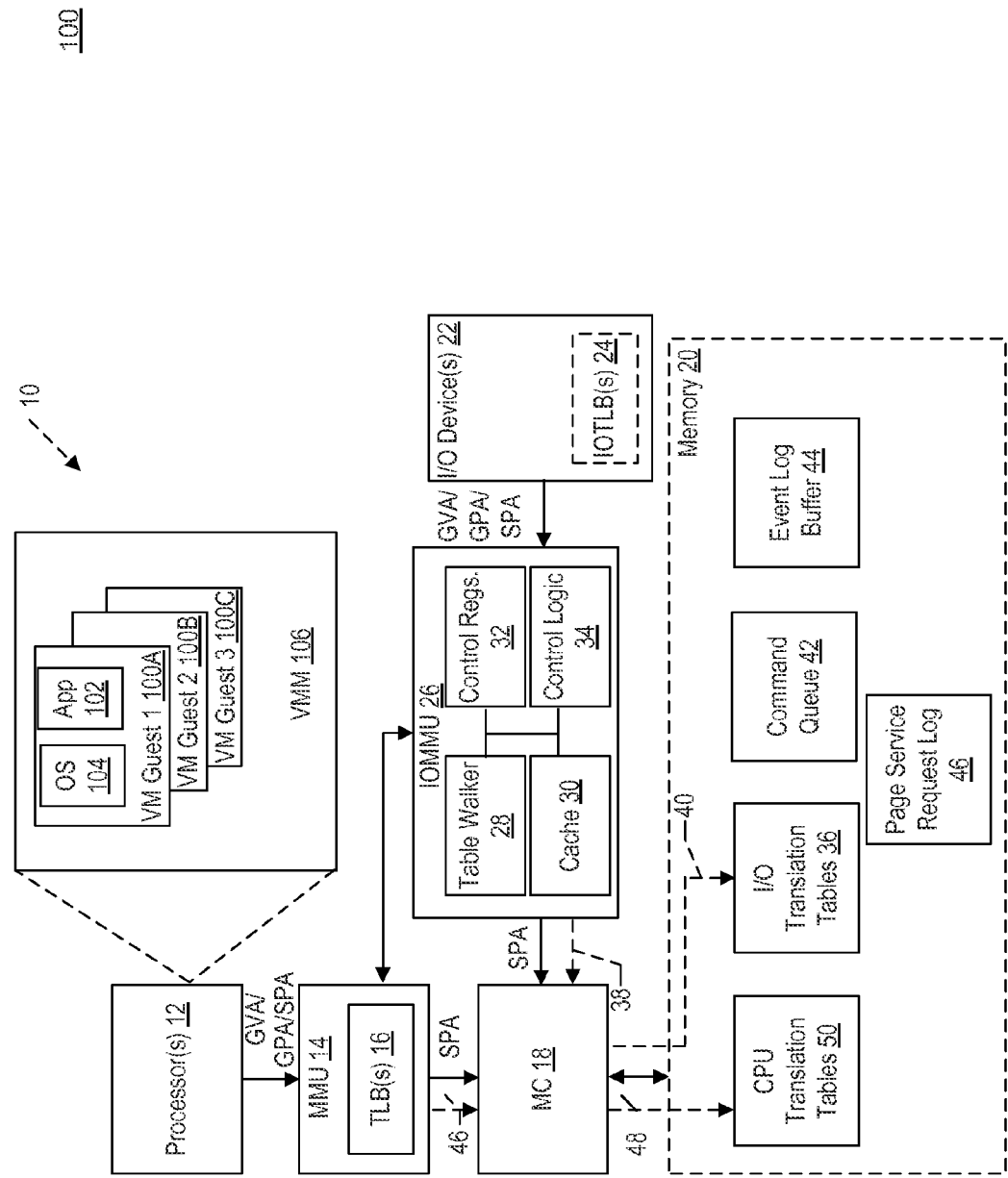
FIG. 1 illustrates a computer system, in accordance with some embodiments.

Referring to FIG. 1, a block diagram is shown that illustrates a simplified, high-level view of a computer system 10, in accordance with some embodiments. In the illustrated embodiment, the system 10 includes one or more processors 12, a memory management unit 14 comprising one or more translation lookaside buffers (TLBs) 16, a memory controller (MC) 18, a memory 20, one or more I/O devices 22 which may comprise one or more I/O TLBs (IOTLBs) 24, and an I/O MMU (IOMMU) 26 which may comprise a table walker 28, a cache 30, control registers 32, and control logic 34. The processors 12 are coupled to the MMU 14, which is coupled to the memory controller 18. The I/O devices 22 are coupled to the IOMMU 26, which is coupled to the memory controller 18. Within the IOMMU 26, the table walker 28, the cache 30, the control registers 32, and the control unit 34 are coupled together.

As described further below, the IOMMU 26 may include various features to simplify virtualization in the system 10. The description below will refer to a virtual machine monitor (VMM) that manages the virtual machines (scheduling their execution on the underlying hardware), controls access to various system resources, etc. It is noted that VMMs are also sometimes referred to as hypervisors. In the illustrated embodiment, processor(s) 12 is executing software in a virtualized environment. Accordingly, three virtual machines 100A, 100B, and 100C (e.g., VM guest 1-3) and a VMM 106 are shown. The number of virtual machines in a given embodiment may vary, and may dynamically change during use as virtual machines are started and stopped by a user. In the illustrated embodiment, the virtual machine 100A includes one or more guest applications 102 and a guest operating system (OS) 104. The OS 104 is referred to as a "guest" OS, since the OS 104 controls the virtual machine created for it by the VMM 106, rather than the physical hardware of the system 10. Similarly, the VM 100B and VM 100C may also each include one or more guest applications and a guest OS.

Generally, the applications in the virtual machines use a guest virtual address space and thus, guest virtual addresses (GVA). The guest OS in each virtual machine may manage mappings of the GVA to guest "physical" addresses (GPA) in the virtual machine. If the guest OS were running directly on the system 10 hardware, with no VMM, the physical addresses generated by the guest OS would indeed be the system physical addresses (SPA) of the memory locations in the system 10. However, in the virtual machine environment, the VMM 106 may manage the mappings from GPA to SPA. Thus, when processor 12 performs memory requests, the guest OS 104 may manage mappings of GVA to GPA (which may be further mapped to SPA by the VMM 106).

As illustrated in FIG. 1, the path from the I/O devices 22 to the memory 20 is at least partially separate from the path of the processors 12 to the memory 20. Specifically, the path from the I/O devices 22 to memory 20 does not pass through the MMU 14, but instead goes through the IOMMU 26. Accordingly, the MMU 14 may not provide memory management for the memory requests sourced from the I/O devices 22. Generally, memory management may comprise address translation from one type of virtual address (i.e., an address that may be used by software) to a physical address (i.e., an address that may be used by the memory controller) and memory protection. Memory protection may control read and/or write access to the memory at some level of granularity (e.g., a page), along with various other attributes such as privilege level requirements, cacheability and cache controls (e.g., writethrough or writeback), coherency, etc. Any set of memory protections may be implemented in various embodiments. In some embodiments, the memory protections implemented by the IOMMU 26 may differ from the memory protections implemented by the MMU 14, in at least some respects. In one embodiment, the memory protections implemented by the IOMMU 26 may be defined so that the translation tables storing the translation data used by the IOMMU 26 and the MMU 14 may be shared (although shown separately in FIG. 1 for ease of discussion). As described further below, in some embodiments that share the translation table information, when a particular page has been promoted such as when privileges change, a table re-walk may be necessary to update translation page tables that may now be unreliable. Other embodiments may not share translation tables between the IOMMU 26 and the MMU 14, as desired.

Generally, the I/O devices 22 may be configured to issue memory requests, such as memory read and write requests, to access memory locations in the memory 20 and in some cases, translation requests. The memory requests may be part of a direct memory access (DMA) read or write operation, for example. The DMA operations may be initiated by software executed by the processors 12, programming the I/O devices 22 directly or indirectly to perform the DMA operations. Depending on the address space in which the software executing on the processor is running, the I/O devices 22 may be provided with addresses corresponding to that address space to access the memory 20. For example, a guest application (e.g., App 102) executing on processor 12 may provide an I/O device 22 with GVAs, while a guest OS executing on processor 12 (e.g., OS 104) may provide GPAs to the I/O devices 22. In either case, when the I/O device 22 requests a memory access, the guest addresses may be translated by the IOMMU 26 to corresponding SPAs to access the memory, and the system physical addresses may be provided to the memory controller 18 for access. That is, the IOMMU 26 may modify the memory requests sourced by the I/O devices 22 to change (i.e., translate) the received address in the request to an SPA, and the memory request may be forwarded to the memory controller 18 to access the memory 20.

In various embodiments, the IOMMU 26 may provide one-level, two-level, or no translations depending on the type of address it receives from the I/O device. More particularly, the IOMMU 26 may perform one-level nested translations or two-level guest translations. That is to say, the IOMMU 26 may provide both GPA to SPA translations (one-level), and GVA to SPA translations (two-level). Thus, as mentioned above, a guest application may provide GVA addresses directly to an I/O device when requesting memory accesses, thereby making conventional VMM interception and translation unnecessary. This functionality may allow advanced computation architectures, such as compute offload, user-level I/O, and accelerated I/O devices, to be used more seamlessly in virtualized systems. It is noted that although one-level, two-level, or no translations are described, it is contemplated that in other embodiments, additional levels of address space may be used. In such embodiments, additional levels of translation (i.e., multilevel translations) may be performed by IOMMU 26 to accommodate the additional address spaces.

As described in greater detail below, the IOMMU 26 has a way of recognizing what type of address it is receiving in a given request. Accordingly, in embodiments in which I/O devices are coupled to IOMMU 26 via standard peripheral buses, such as PCI express (PCIe) interconnects, for example, a process address space identifier (PASID), may be sent to the IOMMU 26 using a transaction layer protocol (TLP) prefix.

The IOMMU 26 may use a number of data structures, such as one or more sets of I/O translation tables 36 stored in the memory 20, to translate the addresses of memory and translation requests from the I/O devices 22. Generally, translation tables may be tables of translation data that can be used to translate addresses from one type to another. The translation tables may store the translation data in any fashion. For example, in one embodiment, the I/O translation tables 36 may include page tables similar to those defined in the x86 and AMD64™ instruction set architectures. Depending on the translation level, various subsets of the guest virtual address bits or guest physical address may be used to index levels of the tables, and each level may either be the end of translation (i.e., storing a real page number for the translation) or may point to another table (indexed by another set of address bits). The page may be the unit of translation (i.e., each address in the virtual page translates to the same physical page). Pages may have varying sizes, from 4 kilobytes up to Megabytes or even Gigabytes.

Additionally, the I/O translation tables 36 may include a device table (shown in FIG. 1) that maps I/O devices to sets of page tables (e.g., by device identifiers). The device identifier (ID) may be defined in a variety of ways, and may be dependent on the peripheral interconnect to which the device is attached. For example, Peripheral Component Interconnect (PCI) devices may form a device ID from the bus number, device number and function number (BDF). HyperTransport™ (HT) devices may use a bus number and unit ID to form a device ID. As described further below, the device table may include a plurality of entries indexed by the device ID, and each entry may include a pointer to a set of page tables used by the device having the corresponding device ID. In addition, in situations where an I/O device is assigned directly to a process or may run computations in the same address space as a user process, the process address space is identified and provided to the IOMMU 26 to enforce memory isolation protections. In some embodiments, the device table may further include a pointer to an interrupt remapping table to remap the device's interrupts. Thus, in general, a translation from a GVA or a GPA to an SPA may be stored in one or more entries in one or more translation tables, and some of the entries may be shared with other translations. Traversing or "walking" the tables from entry to entry may be part of identifying the translation for the virtual address. In one embodiment, the translation tables 36 may include the interrupt remapping table mentioned above.

Specifically, the IOMMU 26 illustrated in FIG. 1 may include the table walker 28 to search the I/O translation tables 36 for a translation for a given memory request. The table walker 28 may generate memory requests, e.g., read memory requests, to read the translation data from the translation tables 36. The translation table reads are illustrated by dotted arrows 38 and 40 in FIG. 1.

To facilitate more rapid translations, the IOMMU 26 may cache some translation data. For example, the cache 30 may be a form of cache similar to a TLB (or IOTLB), which caches the result of previous translations, mapping guest virtual and guest physical page numbers to system physical page numbers and corresponding translation data. If a translation is not found in the cache 30 for the given memory request, the table walker 28 may be invoked. In various embodiments, the table walker 28 may be implemented in hardware, or in a microcontroller or other processor and corresponding executable code (e.g., in a read-only memory (ROM) in the IOMMU 26). Additionally, other caches may be included to cache page tables, or portions thereof, and/or device tables, or portions thereof, as part of cache 30. Accordingly, the IOMMU 26 may include one or more memories to store translation data that is read from, or derived from, translation data stored in the memory 20.

Figure 2:
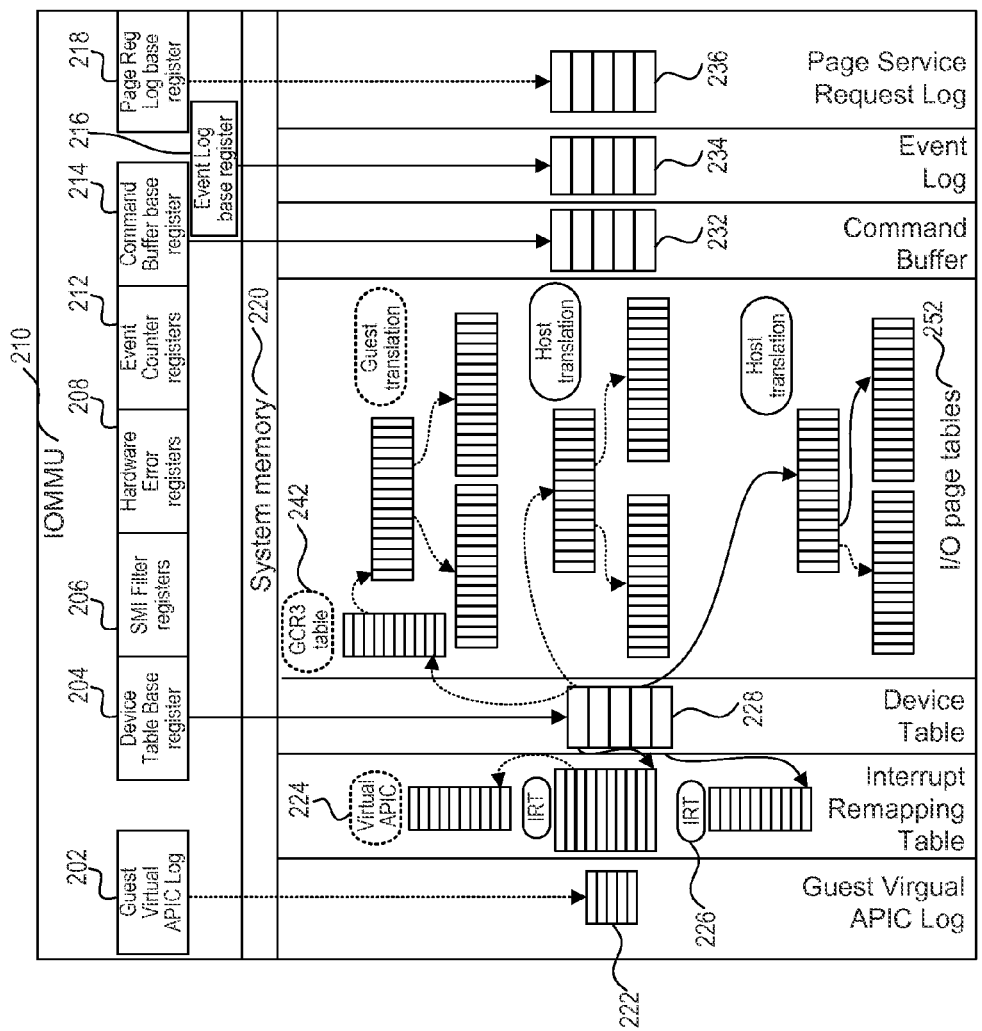
FIG. 2 illustrates an IOMMU architecture, in accordance with some embodiments.

FIG. 2 illustrates further details of an IOMMU architecture, in accordance with some embodiments. For example, cache 30 can include cache versions of I/O page tables 252, device tables 228, and interrupt remapping table (IRT) 226. Cache 30 can also include cache versions of GCR3 table 242. Control registers 32 can include device table base register (DTBR) 204, system management interrupt (SMI) filter registers 206, hardware error registers 208, event counter registers 212, command buffers base register (CBBR) 214, event log base register (ELBR) 216, and page request log base register (PRLBR) 218. Although cache 30 is shown inside IOMMU 26, the scope of embodiments is not limited to such a location. In addition, embodiments include cache 30 being located external to IOMMU 26. At the time of connection of an I/O device, if the IOMMU 210 is detected, software initiates a process of establishing the necessary control and data structures. For example, when IOMMU 210 is set up, the IOMMU 210 can include guest virtual APIC log 202, device table base register (DTBR) 204, system management interrupt (SMI) filter registers 206, hardware error registers 208, event counter registers 212, command buffers base register (CBBR) 214, event log base register (ELBR) 216, and page request log base register (PRLBR) 218. Further, during initial set-up, the IOMMU 210 can include an operator for selecting the appropriate guest page table's base pointer register table. The base pointer register table can be, for example, a control register 3 (CR3) 242 which is used by an x86 microprocessor process to translate physical addresses from virtual addresses by locating both the page directory and page tables for current tasks.

A guest CR3 (GCR3) change can establish a new set of translations and therefore the processor may automatically invalidate TLB entries associated with the previous context. Also, the IOMMU 210 can be associated with one or more TLBs (not shown) for caching address translations that are used for fulfilling subsequent translations without needing to perform a page table walk. Addresses from a device table can be communicated to IOMMU 210.

Once the data structures are set up, the IOMMU 210 may begin to control DMA operation access, interrupt remapping, and address translation.

The IOMMU 210 can use memory management I/O (MMIO) to indicate two-level translation is supported. When two-level translation is determined to be supported, the two-level translation is activated by programming the appropriate device table entries (DTE). In nested paging, transactions associated with the DTE can include page table root pointers, which point to the root of the data structures for I/O page tables 252 in memory 220.

In some embodiments, the IOMMU 210 includes a guest virtual advanced programmable interrupt controller (APIC) construct 224. Other embodiments include an IOMMU having architectural features designed to support the virtualized guest APIC.

System 200 can also include memory 220, which includes additional memory blocks (not shown). A memory controller (not shown) can be on a separate chip or can be integrated in the processor silicon. Memory 220 is configured such that DMA and processor activity communicate with memory controller.

In one example, memory 220 includes I/O page tables 252, device tables 228, interrupt remapping table (IRT) 226, command buffers 232, event logs 234, and a host translation module, such as a hypervisor. Cached versions of I/O page tables 252, device tables 228, interrupt remapping table (IRT) 226 are also included in the IOMMU 210. GCR3 table 242 can also be cached in the IOMMU 210, while virtual APIC 224 may also be cached in some embodiments. Memory 220 can also include one or more guest OSs running concurrently, such as guest OS 1 and guest OS 2. Hypervisor and guest OSs 1 and 2 are software constructs that work to virtualize the system.

The guest OSs are more directly connected to I/O devices in the system 200 because the IOMMU 210, a hardware device, is permitted to do the work that the hypervisor, under traditional approaches, would otherwise have to do.

Further, the IOMMU 210 and the memory 220 may be initialized such that DTBR 204 points to the starting index of device table 228. Further, CBBR 214 is associated with the starting index of command buffers 232, such that the IOMMU 210 can read and consume commands stored in the command buffers 232. The ELBR 216 points to the starting index of event logs 234. PRLBR 218 points to the starting index of peripheral page service request (PPSR) tables 236.

The IOMMU 210 can use memory-based queues for exchanging command and status information between the IOMMU 210 and the system processor(s), such as the CPU. The command queue is represented by command buffers 232 in FIG. 2. The command buffer 232 and event logs 234 are implemented by each active IOMMU 210. Also, each IOMMU 210 may implement an I/O page service request queue.

When enabled, in one example the IOMMU 210 intercepts requests arriving from downstream devices (which may be communicated using, for example, HyperTransport™ link or PCI-based communications), performs permission checks and address translation on the requests, and sends translated versions upstream via the HyperTransport™ link to memory 220 space. Other requests may be passed through unaltered.

The IOMMU 210 can read from tables in memory 220 to perform its permission checks, interrupt remapping, and address translations. To ensure deadlock free operation, memory accesses for device tables 228, I/O page tables 252, and interrupt remapping tables 226 by the IOMMU 210 can use an isochronous virtual channel and may only reference addresses in memory 220. Other memory reads originated by the IOMMU 210 to command buffers 232, event log entries 234, and optional request queue entries (not shown) can use the normal virtual channel.

System performance may be substantially diminished if the IOMMU 210 performs the full table lookup process for every device request it handles. Implementations of the IOMMU 210 are therefore expected to maintain internal caches for the contents of the IOMMU 210's in-memory tables. During operation, IOMMU 210 can use system software to send appropriate invalidation commands as it updates table entries that were cached by the IOMMU 210.

In one example, the IOMMU 210 writes to the event logs 234 in memory 220 with the ability to use the normal virtual channel. The IOMMU 210 can optionally write to a peripheral page service request queue 236 in memory 220. Writes to a peripheral page service request queue 236 in memory also can use the normal virtual channel.

In one example, the IOMMU 210 provides for a request queue in memory to service peripheral page requests while the system processor CPU uses a fault mechanism. Any of I/O devices can request a translation from the IOMMU 210 and the IOMMU 210 may respond with a successful translation or with a page fault.

Host OSs may also perform translations for I/O device-initiated accesses. While the IOMMU 210 translates memory addresses accessed by I/O devices, a host OS may set up its own page tables by constructing I/O page tables that specify the desired translation. The host OS may make an entry in the device table pointing to the newly constructed I/O page tables and can notify the IOMMU of the newly updated device entry. At this point, the corresponding IOMMU I/O tables (e.g., from graphics or other I/O devices) and the host OS I/O tables may be mapped to the same tables.

Any changes the host OS performs on the page protection or translation may be updated in both the processor I/O page tables and the memory I/O page tables.

In one example, the IOMMU 210 is configured to perform I/O tasks traditionally performed by exemplary hypervisor. This arrangement eliminates the need for hypervisor intervention for protection, isolation, interrupt remapping, and address translation. However, when page faults occur that cannot be handled by IOMMU 210, IOMMU 210 may request intervention by hypervisor for resolution. However, once the conflict is resolved, the IOMMU 210 can continue with the original tasks, again without hypervisor intervention.

Hypervisor, also known as virtual machine monitor (VMM), can use the nested translation layer to separate and isolate guest VMs 1 and 2. I/O devices can be directly assigned to any of the concurrently running guest VMs such that I/O devices are contained to the memory space of any one of the respective VMs. Further, I/O devices, such as I/O devices are unable to corrupt or inspect memory or other I/O devices belonging to the hypervisor or another VM. Within a guest VM, there is a kernel address space and several process (user) address spaces. Using nested translation information, without using the guest translation layer, an I/O device can be granted kernel privileges so that it has relatively free access to the entire contents of the guest VM memory.

To enable user-level (process) I/O and advanced computation models, the guest translation layer can be implemented for separation and isolation of guest processes and I/O. Using guest translation in the IOMMU 210, any of the I/O devices can be directly assigned to a process in a guest VM or an I/O device can run computations in the same address space as a user process. The process address space can be identified to the IOMMU 210 so that the proper translation tables will be used. That is, each memory transaction can be tagged with a process address space ID (PASID). More specifically, an example PASID may be used to identify the application address space within an x86-canonical guest VM. The PASID can be used on an I/O device to isolate concurrent contexts residing in shared local memory.

A device ID can be used by IOMMU 210 to select the nested mapping tables for an address translation or interrupt remapping operation. Together, PASID and device ID are used to uniquely identify an application address space.

As noted above, the IOMMU 210 can improve operational efficiency using the same approach as many other hardware components, namely through the use of information caching. In the caching approach, the IOMMU 210 looks up a certain piece of information once and uses that piece of information, but it also stores that information in cache. Thereafter, when a request is made for that same piece of information, it uses the cached version of that information, rather than looking up the piece of information again. There is a small penalty associated with the additional step of the initial storage of the information in cache. However, the small penalty is insignificant compared to the substantial benefit provided by caching of the information. In particular, the more rapid access to information provided by the cache is far superior to the slow access to the same information in memory.

In one example, application of the caching approach to the IOMMU 210 situation focuses on the caching of the information handled by the IOMMU 210, namely address translation information. As noted previously, in one example this information is kept in tables and includes three types of information: device table entries, page table information and interrupt related remapping information.

Over time, this cached information becomes stale due to changes made by the particular operating system (hypervisor). For example, with respect to page table information, a process may terminate and the memory associated with that process would therefore be freed. Subsequently, a new process could be created and the memory that was just freed could be reallocated for the new process. For obvious reasons, old cached information pertaining to the old process is not relevant to the new process. Thus, there are existing invalidate commands that allow the operating system (hypervisor) to surgically invalidate the particular information that is cached in the IOMMU 210.

Thus, when the computer system is running normally, the system software can intermittently when needed (i.e., not on a regular basis) send these invalidate commands to the IOMMU 210 to invalidate the particular information that is cached in certain portions of memory. Consequently, the computer system will discard the contents of the cache memory. When the computer system later needs the contents of that memory location, the computer system will obtain a fresh copy of the contents of that memory. This process is therefore very similar to the traditional caching arrangement, and the relatively low overhead and surgical invalidation of stale cached memory contents is very orderly and efficient.

However, while the procedure is orderly and efficient in dealing with old and new processes, the same cannot be said for abnormal circumstances. For example, should abnormal events manifest themselves, an orderly efficient approach is also desirable. A hardware failure, a hardware crash, a software discovery of a virus attack or any other abnormal event demands that there be a reset (clearing) or an orderly approach to retuning the system to a clean well-known state. Such abnormal events are particularly invidious since the locations of compromised cached memory are unknown.

One alternative to dealing with such abnormal events is to use the available individual invalidate instructions to methodically invalidate all cached memory entries. However, such an undertaking may be prohibitively inefficient. In an exemplary scenario, the following metrics capture the inefficiency of such an approach. A total of 65,536 invalidation commands would need to be sent to invalidate the device table entries. A similar number of invalidation commands would also need to be sent to invalidate the page table entries, and the interrupt related information. Therefore, a total of 196,608 commands would need to be sent and executed in order to address the abnormal event occurrence. Not only would such a process be prohibitively slow, but a total of 196,608 commands consumes considerable memory. Thus, such an approach is not a suitable, nor particularly elegant, approach to addressing the abnormal event occurrence.

In addition to the challenge of efficiently dealing with the clearing of cached data entries, a further challenge is to preserve other information, such as configuration and control information, that pertains to the IOMMU 210 itself. While clearing the entire IOMMU 210 to a known state would be fast and efficient, such an approach overlooks the on-going value to the preservation of such information. Such IOMMU 210 configuration and control information in fact must be preserved, otherwise the desired behavior of the IOMMU 210 itself would be altered. For example, should certain configuration and control information be altered, the IOMMU 210 firewall that precludes unauthorized memory access by an external device would be compromised. Thus, clearing certain configuration and control information results in a security hole being opened up. Given that a virus can be one of the events that leads to the abnormal event occurrences, it is particularly important that the IOMMU 210 firewall be preserved during the recovery process. Further, clearing the state of the base registers would subsequently require that these base registers be reprogrammed to properly handle the logs and commands serviced by these registers. Thus, the challenges are to efficiently clearing cached information pertaining to device table entries, I/O page table entries and interrupt remapping table entries, while preserving the IOMMU 210 configuration and control information.

In accordance with some embodiments, a single command is described that addresses the above challenges. The single command is an "invalidate_all" command that clears the cached memory in the IOMMU 210, while maintaining the configuration and control information that pertains to the IOMMU 210 itself. In some embodiments, the "invalidate_all" command is implemented in hardware using hardware hooks so that execution of this command can be reduced to a small number of cycles, for example one or two cycles.

The single "invalidate_all" command clears the cached information in the I/O page tables (holding guest translation and host translation information), device table entries and interrupt remapping tables. Thus, the single "invalidate_all" command clears cached versions of I/O page tables 252, device tables 228, interrupt remapping table (IRT) 226, GCR3 table 242 and virtual APIC 224, when cached in IOMMU 210. The control and configuration registers are not cached (they are actually implemented in the IOMMU 210), and are not affected by the "invalidate_all" command. Similarly, the base addresses of the command buffer and various logs are not cached by the IOMMU 210, and are not affected by the "invalidate_all" command. For example, guest virtual APIC log 222, command buffers 232, event logs 234 and page service request log 236 are not cached, and are not affected by the "invalidate_all" command. In fact, this information is implemented in system memory, but is rarely used, and therefore offers no benefit to a caching approach.

In a typical use model for the "invalidate_all" command, the command would be invoked by the system in response to detection of an abnormal event, such as a hardware failure, a hardware crash, a software discovery of a virus attack, or activation of the reset button.

FIG. 3 provides a flowchart of a method that invalidates cached content, in accordance with some embodiments. It is to be appreciated the operations shown may be performed in a different order, and in some instance not all operations may be required.

The process begins at step 310. In step 310, a MMU caches address translation information for later use. In an exemplary embodiment, the MMU can be an IOMMU 210. In an exemplary embodiment, the address translation information can include one or more of I/O page table entries, device table entries, and interrupt remapping table information.

In step 320, the system receives notification of a detected presence of a predetermined event (e.g., an abnormal event such as a hardware failure, a hardware crash, a software discovery of a virus attack, or activation of the reset button).

In step 330, the cached information of the IOMMU 210 is cleared in response to the received notification of the detection of an abnormal event. In one particular embodiment, an "invalidate_all" command is used by the system. The "invalidate_all" command can be implemented in hardware.

In step 340, the IOMMU 210 configuration and control information is preserved when the "invalidate_all" command is used by the system.

In step 350, method 300 ends.

The embodiments described, and references in the specification to "some embodiments," indicate that the embodiments described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with particular embodiments, it is understood that it is within the knowledge of one skilled in the art to effect such feature, structure, or characteristic in connection with other embodiments whether or not explicitly described.

The embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the inventive subject matter such that others can, by applying knowledge within the skill of the art, readily modify and/or adapt for various applications such specific embodiments, without undue experimentation, without departing from the general concept of the inventive subject matter. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

What is claimed is:

1. A method comprising:
   caching information in a cache for a memory management unit of a computer system, wherein the management unit comprises a cache and non-cached registers;
   detecting an abnormal event;
   storing control and configuration information of the memory management unit in the non-cached registers; and
   in response to a single command generated in response to the abnormal event, clearing at least a subset of the information in the cache in response to the detecting the abnormal event, and preserving the control and configuration information in the non-cached registers,
   wherein the caching, storing, detecting and clearing are performed by one or more digital devices.

2. The method of claim 1, wherein the clearing the information in response to the detecting includes clearing all information in the cache for an input/output (I/O) page table, a device table and an interrupt remapping table.

3. The method of claim 1, wherein the abnormal event is selected from the group consisting of a hardware failure, a hardware crash, a software detection of a virus attack, and an activation of a reset button.

4. The method of claim 1, wherein the information includes information selected from the group consisting of an input/output (I/O) page table entry, a device table entry and an interrupt remapping table entry.

5. The method of claim 1, wherein the memory management unit is an I/O memory management unit (IOMMU).

6. The method of claim 1, wherein the cache is an I/O translation look-aside buffer (IOTLB) in the memory management unit.

7. The method of claim 1, wherein the single command is implemented in hardware.

8. The method of claim 1, further comprising:
   notifying a host system of the detected abnormal event.

9. The method of claim 1, wherein the preserving configuration and control information includes preserving IOMMU configuration and control information.

10. The method of claim 9, wherein the IOMMU configuration and control information is stored in at least one of a register and a log.

11. A computer system comprising:
    a memory management unit, comprising a cache and non-cached registers, configured to:
    cache information in the cache of the memory management unit,
    detect an abnormal event,
    store control and configuration information of the memory management unit in the non-cached registers, and
    in response to a single command generated in response to the abnormal event, clear at least a subset of the information in the cache in response to the detection, and preserve the control and configuration information in the non-cached registers;
    wherein the memory management unit comprises one or more digital devices.

12. The system of claim 11, wherein the memory management unit is further configured to clear all information in the cache for an input/output (I/O) page table, a device table and an interrupt remapping table.

13. The system of claim 11, wherein the abnormal event is selected from the group consisting of a hardware failure, a hardware crash, a software detection of a virus attack, and an activation of a reset button.

14. The system of claim 11, wherein the information includes information selected from the group of an input/output (I/O) page table entry, a device table entry and an interrupt remapping table entry.

15. The system of claim 11, wherein the memory management unit is an I/O memory management unit (IOMMU).

16. The system of claim 11, wherein the cache is an I/O translation look-aside buffer (IOTLB) in the memory management unit.

17. The system of claim 11, wherein the single command is implemented in hardware.

18. The system of claim 11, wherein the memory management unit is further configured to:
    notify a host system of the detected abnormal event.

19. The system of claim 18, wherein the memory management unit is a I/O Memory Management Unit (IOMMU).

20. The system of claim 19, wherein the IOMMU configuration and control information is stored in at least one of a register and a log.

21. A tangible non-transitory computer-readable medium having stored thereon computer-executable instructions, execution of which by a computing device cause the computing device to perform operations comprising:
    caching information in a cache for a memory management unit of a computer system, wherein the memory management unit comprises a cache and non-cached registers;
    detecting an abnormal event;
    storing control and configuration information of the memory management unit in the non-cached registers; and
    in response to a single command generated in response to the abnormal event, clearing at least a subset of the information in the cache in response to the detecting the abnormal event, and preserving the control and configuration information in the non-cached registers.

* * * * *